United States Patent
Chimmapudi et al.

(10) Patent No.: US 9,392,498 B2
(45) Date of Patent: Jul. 12, 2016

(54) INTELLIGENT MODE SELECTION FOR CIRCUIT SWITCHED FALL BACK DEVICES

(71) Applicant: QUALCOMM Incorporated, San Diego, CA (US)

(72) Inventors: Neelakanta Venkata Seshachalam Chimmapudi, San Diego, CA (US); Rao Sanyasi Yenamandra, San Diego, CA (US); Saad Zaidi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 29 days.

(21) Appl. No.: 14/522,096

(22) Filed: Oct. 23, 2014

(65) Prior Publication Data
US 2016/0119822 A1    Apr. 28, 2016

(51) Int. Cl.
*H04L 12/66* (2006.01)
*H04W 36/00* (2009.01)
(Continued)

(52) U.S. Cl.
CPC .......... *H04W 36/0022* (2013.01); *H04W 24/04* (2013.01); *H04W 76/026* (2013.01)

(58) Field of Classification Search
CPC ......... H04L 65/00; H04L 45/00; H04L 45/02; H04L 45/04; H04L 2012/64; H04L 12/64; H04L 65/102; H04L 29/06176; H04L 12/6418; H04L 29/06; H04W 36/0022; H04W 24/04; H04W 76/026
USPC ......................................... 370/352–357, 389
See application file for complete search history.

(56) References Cited

U.S. PATENT DOCUMENTS 9,220,036 B2 * 12/2015 Ramachandran . H04W 36/0022
2010/0279648 A1 * 11/2010 Song ........................ H04W 4/22
455/404.1

(Continued)

FOREIGN PATENT DOCUMENTS

EP    2731380 A1    5/2014
EP    2753140 A2    7/2014

(Continued)

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 12)," 3GPP TS 36.331 v12.3.0 (Sep. 2014) Technical Specification, Sep. 2014, 378 pgs., 3rd Generation Partnership Project, Valbonne, France.

(Continued)

*Primary Examiner* — Brenda H Pham
(74) *Attorney, Agent, or Firm* — Holland & Hart LLP

(57) ABSTRACT

Methods, systems, and devices are described for wireless communication, including for intelligent mode selection for circuit switched fall back devices. A user equipment (UE) attached to a wireless network may determine that circuit switched fall back (CSFB) service is not available. The UE may thus elect to operate in a packet switched (PS) operating mode until CSFB service again becomes available. For example, the UE may receive a system information block (SIB) indicating that the CSFB connection is not available, the UE may attempt to access a CSFB a predetermined number of times, or the UE may miss a number of voice calls. The UE may, based on this determination, select a packet switched (PS) operating mode. The UE may continue to exchange PS data with the serving cell based on the PS operating mode. The UE may then periodically evaluate the signal quality for a 1x cell.

26 Claims, 13 Drawing Sheets

(51) Int. Cl.
*H04W 24/04* (2009.01)
*H04W 76/02* (2009.01)

(56) References Cited

U.S. PATENT DOCUMENTS

| | | | |
|---|---|---|---|
| 2010/0317315 A1* | 12/2010 | Burbidge | H04W 36/0022 455/404.1 |
| 2010/0329244 A1 | 12/2010 | Buckley et al. | |
| 2012/0015650 A1* | 1/2012 | Pudney | H04W 8/08 455/434 |
| 2012/0120789 A1 | 5/2012 | Ramachandran et al. | |
| 2012/0214483 A1 | 8/2012 | Tong et al. | |
| 2013/0148627 A1 | 6/2013 | Das et al. | |
| 2013/0329638 A1 | 12/2013 | Ren et al. | |
| 2014/0087723 A1* | 3/2014 | Cili | H04W 24/08 455/426.1 |
| 2014/0128074 A1 | 5/2014 | Vangala et al. | |
| 2014/0133457 A1* | 5/2014 | Han | H04W 36/0022 370/331 |
| 2014/0177596 A1 | 6/2014 | Watfa et al. | |

FOREIGN PATENT DOCUMENTS

| | | |
|---|---|---|
| WO | WO-2010065931 A1 | 6/2010 |
| WO | WO-2014117390 A1 | 8/2014 |

OTHER PUBLICATIONS

Huawei et al., "Further Discussion on PS Services Resuming After CSFB Failure," 3GPP TSG CT WG1 Meeting #86bis, C1-141076, Dubrovnik, Croatia, Mar. 31-Apr. 4, 2014, 4 pgs., 3rd Generation Partnership Project.

ISA/EPO, International Search Report and Written Opinion of the International Searching Authority, Int'l Appl. No. PCT/US2014/062220, Jun. 9, 2015, European Patent Office, Rijswijk, NL, 12 pgs.

\* cited by examiner

INTELLIGENT MODE SELECTION FOR CIRCUIT SWITCHED FALL BACK DEVICES

BACKGROUND

1. Field of Disclosure

The following relates generally to wireless communication, and more specifically to intelligent mode selection for circuit switched fall back (CSFB) devices.

2. Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system).

By way of example, a wireless multiple-access communications system may include a number of base stations, each simultaneously supporting communication for multiple communication devices, which may be otherwise known as a user equipment (UE). A base station may communicate with UEs on downlink channels (e.g., for transmissions from a base station to a UE) and uplink channels (e.g., for transmissions from a UE to a base station).

In some cases, a wireless communication system may include both packet switched (PS) network components for data transfer and circuit switched (CS) fall back components for voice communications. For example, some base stations may be configured for PS operation and other base stations may be configured for circuit switched CS operation. In some cases, the CS network components may be legacy network components, such as third generation (1x) wireless network components. Additionally, a UE may have a voice centric usage setting which prompts it to seek out a CSFB connection for exchange of voice data. If a voice centric UE is unable to establish a CS connection it may disconnect from the network. In some cases, a UE may disconnect from a PS network when there is no CSFB network available. This may result in a service disruption for the user.

SUMMARY

Methods, systems, methods, and apparatuses for intelligent mode selection for CSFB devices are described. A user equipment (UE) attached to a wireless network may determine that circuit switched fall back (CSFB) service is not available. For example, the UE may receive a system information block (SIB) indicating that the CSFB connection is not available, the UE may attempt to access a CSFB a predetermined number of times, or the UE may miss a number of voice calls. Based on this determination, the UE may select a packet switched (PS) operating mode. The UE may continue to exchange PS data with the serving cell based on the PS operating mode. The UE may then periodically evaluate the signal quality for a 1X cell to determine when it becomes available for CSFB service. If the signal quality goes above a threshold the UE may select a CSFB operating mode.

A method of wireless communication at a UE is described. The method may include establishing a connection with a serving cell, determining that CSFB service is not available, selecting a PS operating mode based on the determination, and exchanging PS data with the serving cell based on selecting the PS operating mode.

An apparatus for wireless communication at a UE is described. The apparatus may include means for establishing a connection with a serving cell, means for determining that CSFB service is not available, means for selecting a PS operating mode based on the determination, and means for exchanging PS data with the serving cell based on selecting the PS operating mode.

A further apparatus for wireless communication at a UE is described. The apparatus may include a processor, memory in electronic communication with the processor, and instructions stored in the memory. The instructions may be executable by the processor to establish a connection with a serving cell, determine that CSFB service is not available, select a PS operating mode based on the determination, and exchange PS data with the serving cell based on selecting the PS operating mode.

A non-transitory computer-readable medium storing code for wireless communication at a UE is described. The code may include instructions executable to establish a connection with a serving cell, determine that CSFB service is not available, select a PS operating mode based on the determination, and exchange PS data with the serving cell based on selecting the PS operating mode.

Some examples of the method, apparatuses, or non-transitory computer-readable medium described above may further include features, means, or instructions for identifying a voice centric usage setting of the UE, and selecting the PS operating mode may be based at least in part on the identified voice centric usage setting. Additionally or alternatively, in some examples, selecting the PS operating mode includes selecting a data centric usage setting.

Some examples of the method, apparatuses, or non-transitory computer-readable medium described above may further include features, means, or instructions for determining that a CSFB system information block (SIB) has not been received from a serving cell, and determining that the CSFB service is not available is based at least in part on determining that the CSFB SIB has not been received. Additionally or alternatively, in some examples the CSFB SIB is SIB8.

Some examples of the method, apparatuses, or non-transitory computer-readable medium described above may further include features, means, or instructions for determining that an attempt to acquire system information for a CSFB network has failed, and determining that the CSFB service is not available is based at least in part on the failed attempt. Additionally or alternatively, some examples may include incrementing a failed attempt counter based on the failed attempt, and determining that the failed attempt counter exceeds a threshold, and determining that the CSFB service is not available may be based at least in part on determining that the failed attempt counter exceeds the threshold.

Some examples of the method, apparatuses, or non-transitory computer-readable medium described above may further include features, means, or instructions for receiving a voice call paging message, where determining that an expected voice call has not been received may be based at least in part on the received voice call paging message, and determining that the CSFB service is not available may be based at least in part on determining that the expected voice call has not been received. Additionally or alternatively, some examples may include incrementing a failed call counter based on determining that the expected voice call has not been received, and determining that the CSFB service is not available may be based at least in part on the failed call counter.

Some examples of the method, apparatuses, or non-transitory computer-readable medium described above may further include features, means, or instructions for determining that a signal quality for a 1X cell is below a threshold, and determining that the CSFB service is not available may be based at least in part on determining that the signal quality for the 1X cell is below the threshold. Additionally or alternatively, some examples may include periodically evaluating the signal quality based on the PS operating mode, determining that the signal quality for the 1X cell is above the threshold, and selecting a CSFB operating mode based on determining that the signal quality for the 1X cell is above the threshold.

In some examples of the method, apparatuses, or non-transitory computer-readable medium described above, exchanging PS data includes receiving a paging message from the serving cell. Additionally or alternatively, some examples may include performing a mobility procedure, and selecting a voice centric usage setting based on performing the mobility procedure.

In some examples of the method, apparatuses, or non-transitory computer-readable medium described above, the serving cell is a small cell, and determining that the CSFB service is not available may be based at least in part on the serving cell being the small cell.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

A user equipment (UE) attached to a wireless network may determine that circuit switched fall back (CSFB) service is not available. The UE may, for instance, receive a system information block (SIB) indicating that the CSFB connection is not available, or the UE may attempt to access a CSFB a predetermined number of times, or the UE may miss a number of voice calls. The UE thus, in some cases, selects a packet switched (PS) operating mode. The UE may continue to exchange PS data with the serving cell based on the PS operating mode. The UE may then periodically evaluate the signal quality for a 1X cell to determine when it becomes available for CSFB service. If the signal quality then exceeds a threshold, the UE may select, or re-select, a CSFB operating mode.

In some cases, a wireless communication system may include both packet switched (PS) network components for data transfer and circuit switched (CS) fall back components for voice communications. For example, some base stations may be configured for PS operation and other base stations may be configured for circuit switched CS operation. In some cases, the CS network components may be or include legacy network components, such as third generation or code-division multiple access (CDMA) (e.g., 1X), wireless network components. Additionally, a UE may have a voice centric usage setting, which may prompt it to seek out a CSFB connection for exchange of voice communications. If a voice centric UE is unable to establish a CS connection, the UE may disconnect from the network. In some cases, a UE may disconnect from a PS network when there is no CSFB network available. This may result in a service disruption or otherwise undesirable results for the user.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
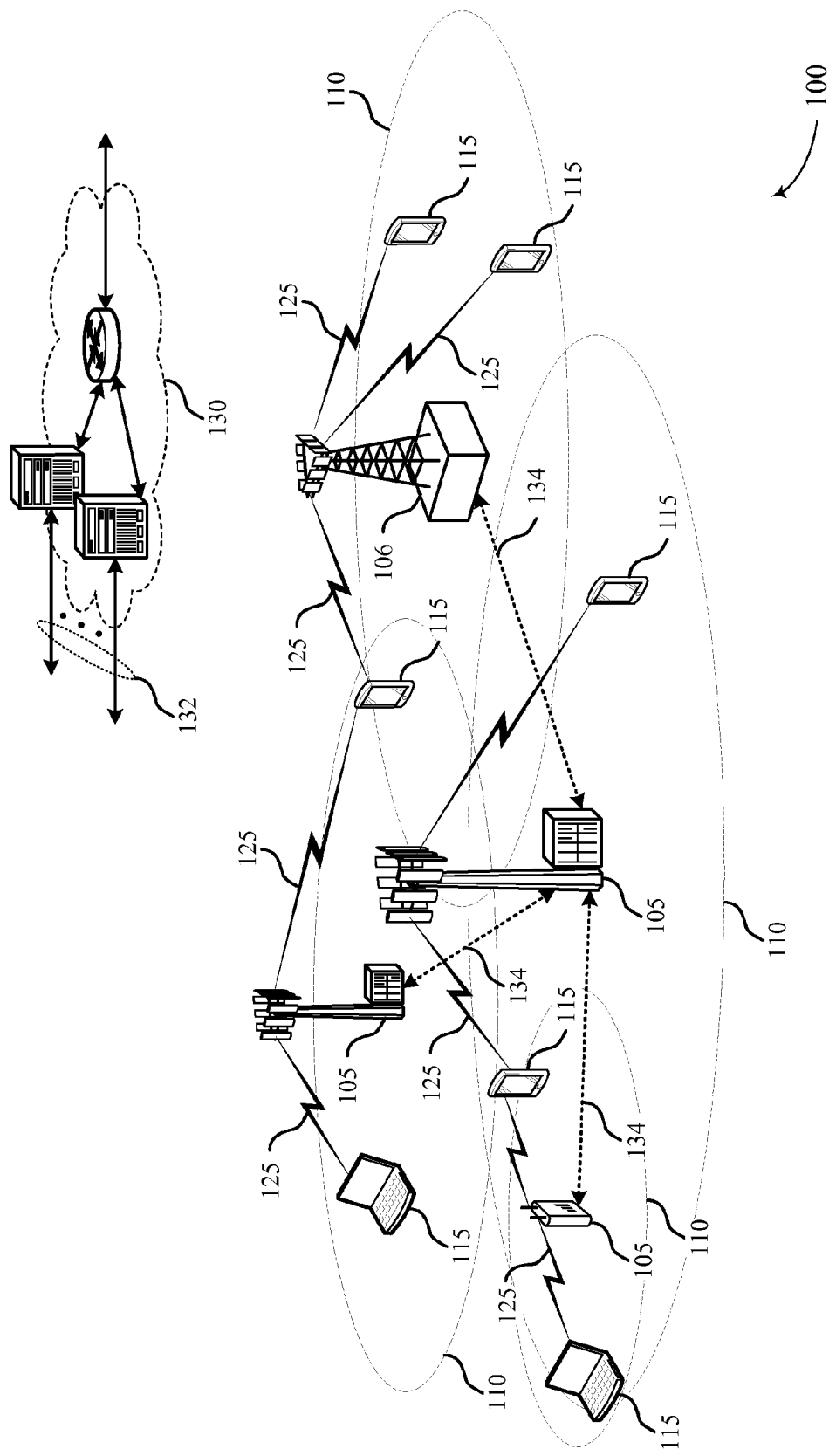
FIG. 1 illustrates an example of a wireless communications system for intelligent mode selection for circuit switched fall back (CSFB) devices in accordance with various aspects of the present disclosure.

FIG. 1 illustrates an example of a wireless communications system 100 in accordance with various aspects of the present disclosure. The system 100 includes base stations 105, UEs 115, and a core network 130. The system 100 may also include 1X cells 106 for legacy UEs 115 and CSFB operations. The core network 130 may provide user authentication, access authorization, tracking, internet protocol (IP) connectivity, and other access, routing, or mobility functions. The base stations 105 interface with the core network 130 through backhaul links 132 (e.g., S1, etc.). In some cases, 1X cells 106 may interface with the core network via an S102 tunnel (not shown). The base stations 105 (and 1X cells 106) may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 (and 1x cells 106) may wirelessly communicate with the UEs 115 via one or more base station antennas. Each of the base stations 105 may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro and/or small cell base stations). There may be overlapping geographic coverage areas 110 for different technologies In some examples, the wireless communications system 100 is a Long Term Evolution (LTE)/LTE-Advanced (LTE-A) network. In LTE/LTE-A networks, the term evolved node B (eNB) may be generally used to describe the base stations 105. The wireless communications system 100 may be a heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context.

In some cases, wireless communications system 100 may include small cells whose coverage areas 110 may overlap the coverage area 110 of one or more macro base stations 105. In some cases, small cells may be added in areas with high user demand or in areas not sufficiently covered by a macro base station 105. For example, a small cell may be located in a shopping center, or in an area where signal transmissions are blocked by terrain or buildings. In some cases, small cells may improve network performance by allowing macro base stations 105 to offload traffic when load is high. A network that includes both large and small cells may be known as a heterogeneous network. A heterogeneous network may also include Home eNBs (HeNBs) which may provide service to a restricted group known as a closed subscriber group (CSG). For example, an office building may contain small cells for use only by the occupants of the building. In some cases, heterogeneous networks may involve more complex network planning and interference mitigation techniques than homogenous networks.

A macro cell generally covers a relatively large geographic area (e.g., several kilometers in radius) and may allow unrestricted access by UEs 115 with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or packet data convergence protocol (PDCP) layer may be IP-based. A radio link control (RLC) layer may perform packet segmentation and reassembly to communicate over logical channels. A medium access control (MAC) layer may perform priority handling and multiplexing of logical channels into transport channels. The MAC layer may also use hybrid automatic repeat request (HARD) to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like.

A UE 115 may be able to communicate with various types of base stations and network equipment including 1x cells, macro eNBs, small cell eNBs, relay base stations, and the like. A CSFB capable UE 115—e.g., a voice-centric UE 115 capable of multimode LTE/1x operation—could originate and terminate 1xRTT CS voice calls while idling or in connected mode on an LTE cell with overlapping 1x coverage (e.g., LTE/1x network), which is more fully described below, with reference to FIG. 2.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

In some embodiments of the system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple input multiple output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

After accessing a network, a UE 115 may receive one or more system information blocks (SIBs). Different SIBs may be defined according to the type of system information conveyed. SIB1 contains access information, including cell identity information, and may also indicate whether a UE 115 is allowed to camp on a cell. SIB1 also includes cell selection information (or cell selection parameters). Additionally, SIB1 includes scheduling information for other SIBs. SIB2 includes access information and parameters related to common and shared channels. SIB3 includes cell reselection parameters. SIB4 and SIB5 include reselection information about neighboring LTE cells. SIB6 through SIB8 include reselection information about non-LTE (e.g., Universal Mobile Telecommunications System (UMTS), global system for mobility (GSM) EDGE radio access network (GERAN), and code division multiple access (CDMA) neighboring cells). In some cases, SIB8 may contain information about the availability of a legacy generation cell (e.g., 1x cell 106) for CSFB service. SIB9 includes the name of a Home eNB. SIB10 through SIB12 include emergency notification information (e.g., tsunami and earthquake warnings). And SIB13 includes information related to multimedia broadcast multicast service (MBMS) configuration.

A UE 115 attached to a wireless communications system 100 may determine that CSFB service is not available. For example, the UE 115 may receive a SIB indicating that a 1x cell 106 is not available, the UE 115 may attempt to access a CSFB a predetermined number of times, or the UE 115 may miss a number of voice calls. Based on this determination, the UE 115 may select a PS operating mode. The UE 115 may continue to exchange PS data with the serving base station 105 based on the PS operating mode. The UE may then periodically evaluate the signal quality for a 1x cell 106 to determine when it becomes available for CSFB service. If the signal quality goes above a threshold the UE may select a CSFB operating mode and establish a connection with the 1x cell 106. This may allow the UE 115 to avoid simply disabling LTE communications, which it might otherwise be do in order to avoid repeated searching for 1x coverage.

Figure 2:
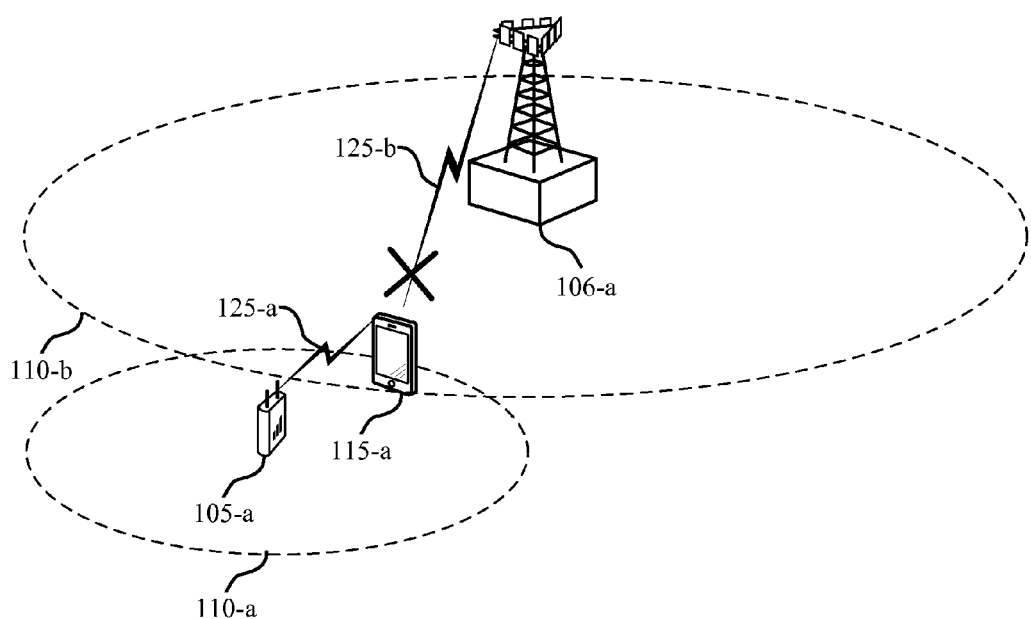
FIG. 2 illustrates an example of a wireless communications system for intelligent mode selection for CSFB devices in accordance with various aspects of the present disclosure.

FIG. 2 illustrates an example of a wireless communications system 200 for intelligent mode selection for CSFB devices in accordance with various aspects of the present disclosure. Wireless communications system 200 may include a UE 115-a, which may be an example of a UE 115 described above with reference to FIG. 1. Wireless communications system 200 may also include a base station 105-a, which may be an example of a base station 105 described above with reference to FIG. 1. In some examples, base station 105-a may be a small cell. In other examples, base station 105-a may be provide service for one or more macro cells (not shown). UE 115-a may be connected to base station 105-a via wireless communication link 125-a.

Wireless communications system 200 may also include a 1x cell 106-a with coverage area 110-b. In some cases, UE 115-a may be initially operating in a CSFB mode. But wireless communication link 125-b between UE 115-a and 1x cell 106-a may be weak or non-existent. For example, UE 115-a may be at, near, or beyond the edge of coverage area 110-b. Thus, UE 115-a may determine that CSFB service is not available. For example, UE 115-a may receive a SIB indicating that CSFB service is not available, UE 115-a may unsuccessfully attempt to access 1x cell 16-a a predetermined number of times, or UE 115-a may miss a number of voice calls. In other examples (not shown), wireless communications system 200 may not include a 1x cell 106-a. Based on the determination that CSFB service is not available, UE 115-a may select a PS operating mode.

By utilizing a PS operating mode in response to 1x cell conditions (e.g., RF conditions, lack of coverage, non-existent 1x cell, etc.), UE 115-a may avoid issues associated with CSFB operation. For instance, in a typical CSFB operation, a UE 115 may attempt to perform a CS fallback procedure when the UE 115 either receives a mobile terminated (MT) page, or decides to make a mobile originated (MO) call. In the absence of 1x coverage, the UE 115 may be unable to acquire 1x system information, it may declare Out of Service, and the MT or MO call may fail. Without selecting a PS operating mode when faced with this lack of CS coverage, the UE 115 may attempt a fruitless reselection procedure for a LTE/1x network. In some cases, a UE 115 that remains in a CSFB operating mode despite the lack of CS coverage and may enter a race condition, in which, if the UE 115 is stationary, there could be repeated failed MO or MT calls, ultimately resulting in an Out of Service declaration. In order to avoid these or other CSFB issues, UE 115-a may, as described herein, select the PS operating mode upon determining that 1x coverage is unavailable either via system information (e.g., received or conspicuously absent system information), or upon determining that a number of MO or MT call attempts has failed.

Once UE 115-*a* selects a PS operating mode, it may continue to exchange PS data with base station 105-*a*. In some cases, UE 115-*a* may then periodically evaluate the signal quality for 1x cell 106-*a* to determine when it becomes available for CSFB service. If the signal quality goes above a threshold UE 115-*a* may select a CSFB operating mode and establish (or re-establish) a connection with 1x cell 106-*a*. The mode change from PS to CSFB may be based on a subscriber profile stored within the home subscriber server (HSS) of the LTE network. The LTE network may thus configure UE 115-*a* (e.g., utilizing RRC signaling) according to the subscriber profile.

In some examples, the PS network may be a network in which CS service is not available. For example, the network may only have PS service. The PS operating mode may therefore correspond to operation on a network that does not have CSFB capacity, or only has PS service. In some instances, the PS operating mode may also provide for operation that does not attempt CSFB procedure.

Figure 3:
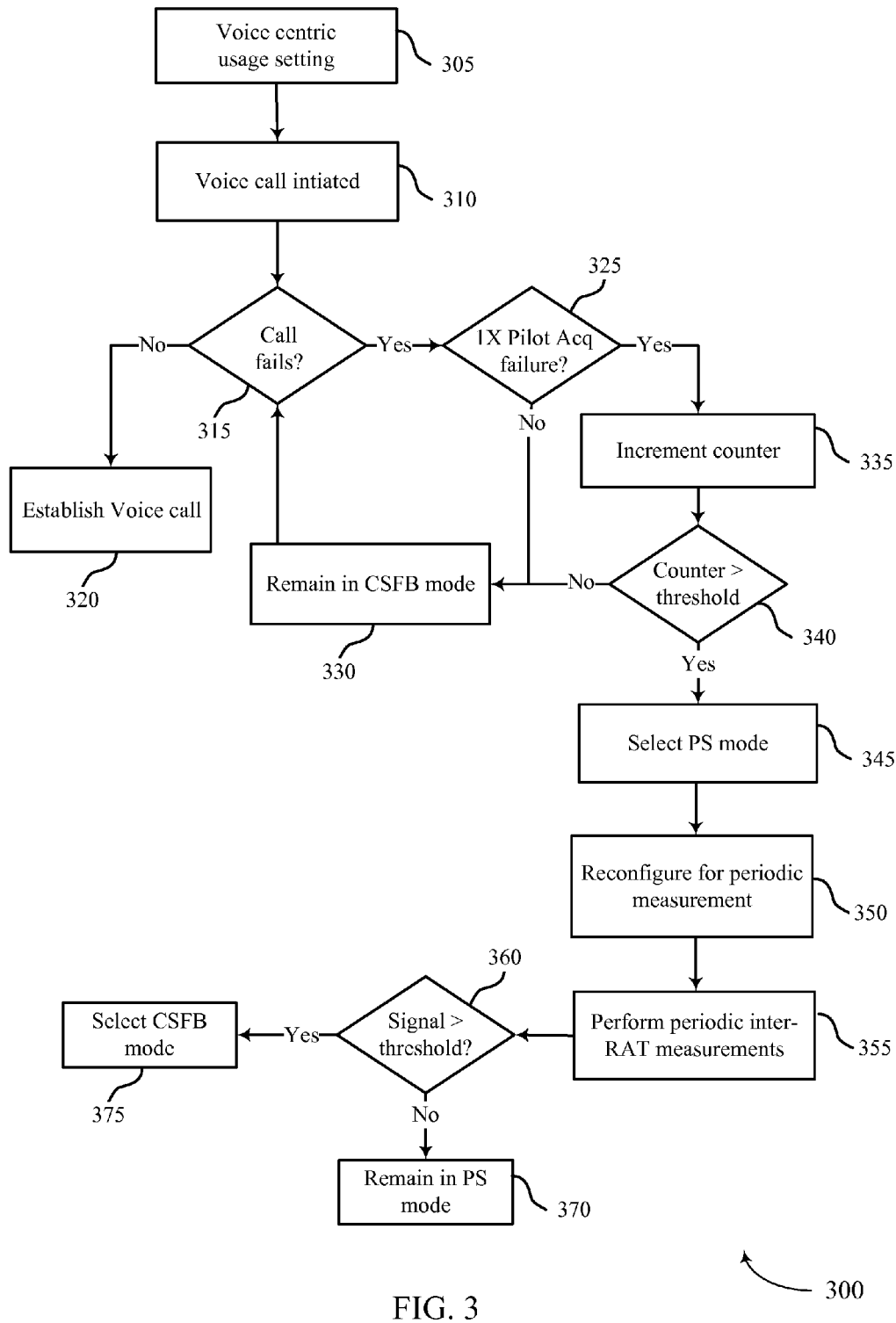
FIG. 3 illustrates an example of a decision flow for intelligent mode selection for CSFB devices in accordance with various aspects of the present disclosure.

FIG. 3 illustrates an example of a decision flow 300 for intelligent mode selection for CSFB devices in accordance with various aspects of the present disclosure. Decision flow 300 may illustrate selection of a PS operating mode, and may be performed by a UE 115 as described above with reference to FIGS. 1-2. Decision flow 300 may also include steps involving a base station 105 and/or a 1x cell 106 as described above with reference to FIGS. 1-2.

At step 305, the UE 115 may establish a connection with a serving cell. In some examples, the UE 115 may have a voice centric usage setting (e.g., the UE 115 may prefer a voice connection over a data connection). Additionally, UE 115 may be configured for CSFB operation.

At steps 310-340, the UE 115 may determine that CSFB service is not available. For example, at step 310, the UE 115 may initiate a voice call or receive a paging message for an incoming call. At step 315, the UE 115 may determine whether the call has failed (e.g., whether a MT page or an MO call has failed).

If the call has not failed, at step 320 the UE 115 may continue the call using the CSFB (e.g., via a 1x cell 106). However, if the call fails, the UE 115 may determine whether a pilot acquisition for the 1x cell 106 has failed. If pilot acquisition has failed, the UE may increment a counter at step 335.

At step 340 the UE 115 may compare the counter to a threshold. If the counter is greater than a threshold, at step the UE 115 may determine that CSFB service is not available and select a PS mode. If the pilot for the 1x cell 106 has been acquired or if the counter is not greater than the threshold, at step 330 the UE 115 may remain in CSFB mode and wait for another call.

Other methods of determining that CSFB service is not available are also possible. For example, the UE 115 may determine that a CSFB SIB (e.g., SIB8) has not been received from a serving cell. As another example, the UE 115 may determine that an attempt to acquire system information for a CSFB network (with or without a call failure), and may increment a failed attempt counter based on the failed attempt.

In another example, the UE 115 may determine that an expected voice call has not been received based on a voice call paging message and increment a failed call counter (with or without searching for a 1x pilot). In another example, the UE 115 may determine that a signal quality for a 1x cell 106 is below a threshold.

At step 345, UE 115 may select a PS operating mode based on the determination that CSFB service is not available. In some cases, selecting a PS operating mode may include selecting a data centric usage setting. At step 350, the UE 115 may send an RRC reconfiguration message to a serving base station 105 (e.g., to activate measurement gaps or to establish an measurement reporting configuration). In some cases, the UE 115 may then configure periodic measurements of the signal quality of a 1x cell 106 (e.g., a reference signal received power (RSRP), reference signal received quality (RSRQ) or a signal to noise/interference ratio such as signal energy over background interference ($E_c/I_0$)).

At step 355, the UE may periodically evaluate the signal quality based on the PS operating mode. For example, the UE 115 may perform an inter-radio access technology (RAT) signal measurement to determine the signal quality of the 1x cell 106.

At step 360, the UE 115 may determine whether the signal quality for the 1x cell 106 is above the threshold. If the signal quality is above the threshold, at step 375 the UE 115 may select a CSFB operating mode (and in some cases, switch back to a voice centric usage setting). If not, at step 370 the UE 115 may remain in PS operating mode and exchange data and/or control messages with the serving base station 105. For example, the UE 115 may continue to receive paging messages from the serving cell.

Figure 4:
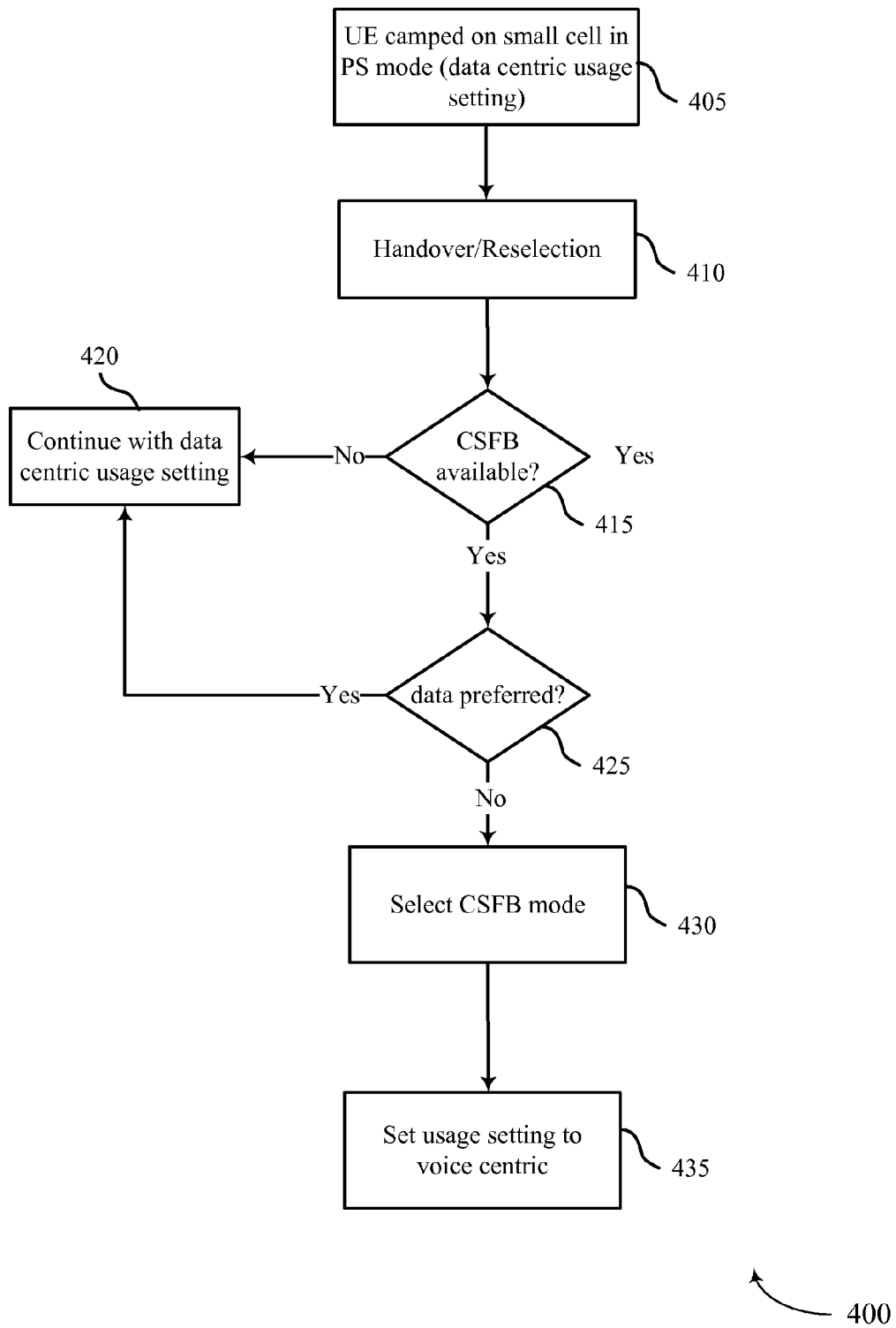
FIG. 4 illustrates an example of a decision flow for intelligent mode selection for CSFB devices in accordance with various aspects of the present disclosure.

FIG. 4 illustrates an example of a decision flow 400 for intelligent mode selection for CSFB devices in accordance with various aspects of the present disclosure. Decision flow 400 may illustrate selection of a CSFB operating mode and may be performed by a UE 115, which may be an example of a UE 115 described above with reference to FIGS. 1-2. Decision flow 400 may also include steps involving a base station 105 and/or 1x cell 106 as described above with reference to FIGS. 1-2. Decision flow 400 may incorporate aspects of decision flow 300 described above with reference to FIG. 3.

At step 405, the UE 115 may establish a connection with a serving cell. For example, UE 115 may be camped on a small cell and may be in PS operating mode (e.g., with a data centric usage setting).

At step 410, the UE 115 may perform a mobility procedure such as a handover or an idle mode reselection. At step 415 the UE 115 may determine whether CSFB service is available for the new serving cell. For example, the UE 115 may determine whether there is a 1x cell 106 with a strong signal quality.

At step 420, if CSFB service is not available the UE 115 may remain in a PS operating mode and/or retain a data centric usage setting.

At step 425, the UE 115 may determine whether a data centric or voice centric usage setting is preferred. If CSFB service is available and voice centric usage setting is preferred, at step 430 the UE 115 may select a CSFB operating mode and at step 435, the UE 115 may select a voice centric usage setting based on the CSFB operating mode.

Figure 5:
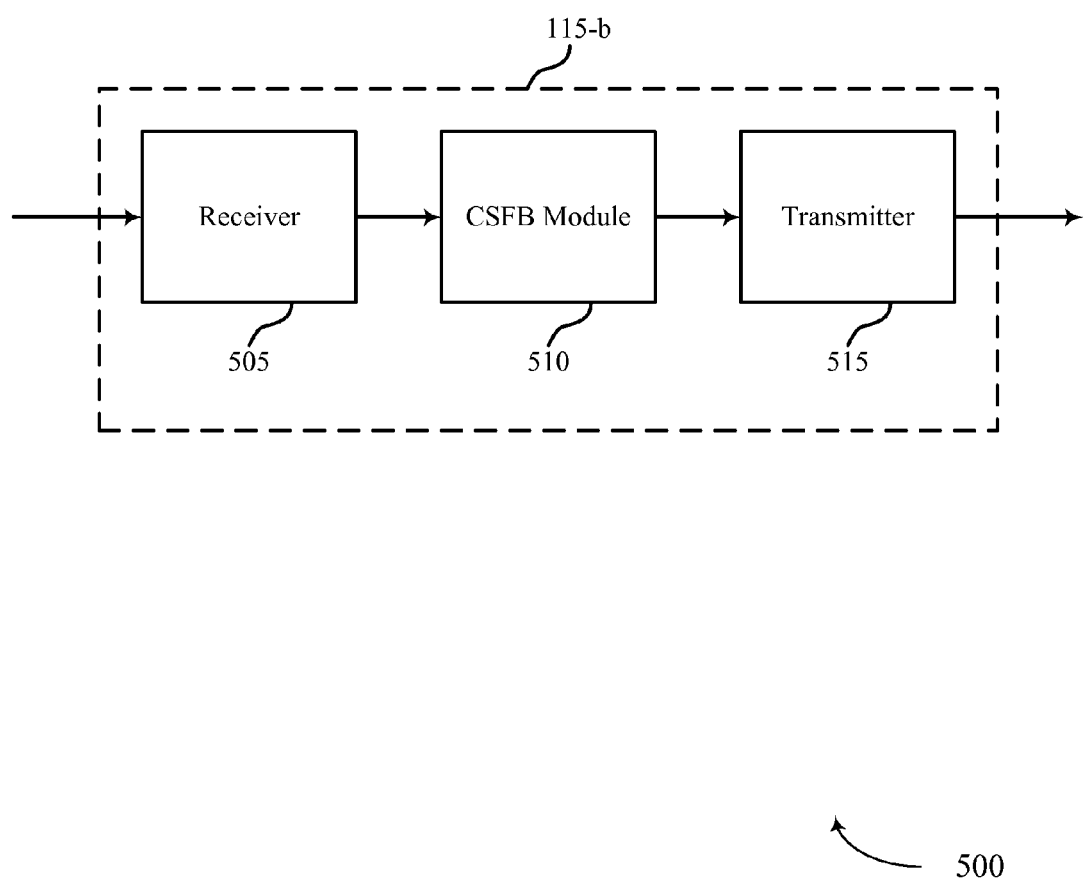
FIG. 5 shows a block diagram of a UE configured for intelligent mode selection for CSFB devices in accordance with various aspects of the present disclosure.

FIG. 5 shows a block diagram 500 of a UE 115-*b* configured for intelligent mode selection for CSFB devices in accordance with various aspects of the present disclosure. UE 115-*b* may be an example of aspects of a UE 115 described with reference to FIGS. 1-4. UE 115-*b* may include a receiver 505, a CSFB module 510, and/or a transmitter 515. UE 115-*b* may also include a processor. Each of these components may be in communication with each other.

The components of UE 115-*b* may, individually or collectively, be implemented with at least one application specific integrated circuit (ASIC) adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

The receiver 505 may receive information such as packets, user data, or control information associated with various information channels (e.g., control channels, data channels, and information related to intelligent mode selection for CSFB devices, etc.). Information may be passed on to the CSFB module 510, and to other components of UE 115-*b*.

The CSFB module 510 may establish a connection with a serving cell, determine that CSFB service is not available, select a PS operating mode based on the determination, and exchange PS data with the serving cell based on selecting the PS operating mode.

The transmitter 515 may transmit signals received from other components of UE 115-*b*. In some embodiments, the transmitter 515 may be collocated with the receiver 505 in a transceiver module. The transmitter 515 may include a single antenna, or it may include a plurality of antennas.

Figure 6:
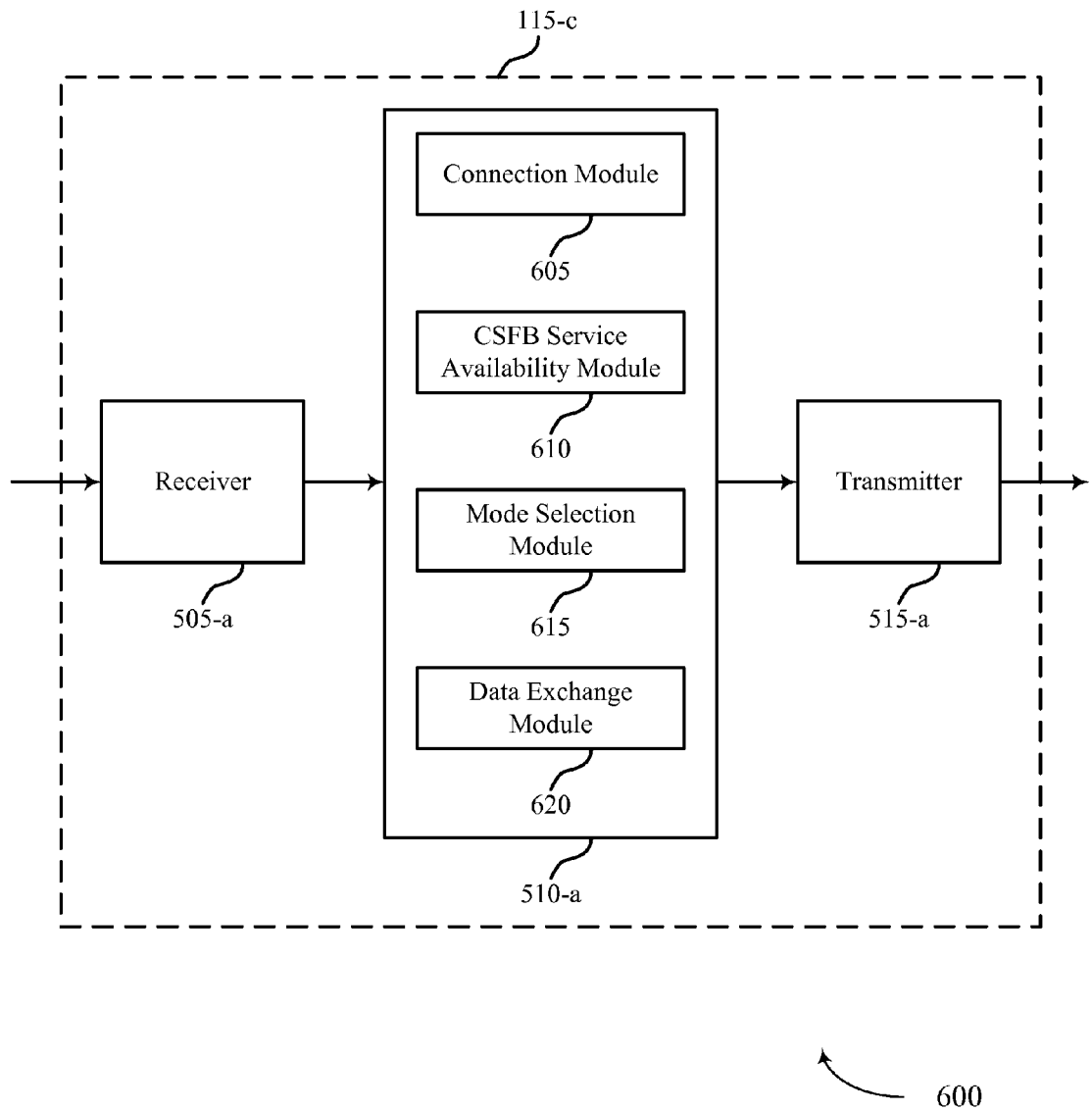
FIG. 6 shows a block diagram of a UE configured for intelligent mode selection for CSFB devices in accordance with various aspects of the present disclosure.

FIG. 6 shows a block diagram 600 of a UE 115-*c* for intelligent mode selection for CSFB devices in accordance with various aspects of the present disclosure. UE 115-*c* may be an example of aspects of a UE 115 described with reference to FIGS. 1-5. UE 115-*c* may include a receiver 505-*a*, a CSFB module 510-*a*, and/or a transmitter 515-*a*. UE 115-*c* may also include a processor. Each of these components may be in communication with each other. The CSFB module 510-*a* may also include a connection module 605, a CSFB service availability module 610, a mode selection module 615, and a data exchange module 620.

The components of UE 115-*c* may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The receiver 505-*a* may receive information which may be passed on to the CSFB module 510-*a*, and to other components of UE 115-*c*. The CSFB module 510-*a* may perform the operations described above with reference to FIG. 5. The transmitter 515-*a* may transmit signals received from other components of UE 115-*c*.

The connection module 605 may establish a connection with a serving cell as described above with reference to FIGS. 2-4. In some examples, the serving cell may be a small cell, and determining that CSFB service may be not available may be based at least in part on the serving cell being the small cell.

The CSFB service availability module 610 may determine that CSFB service is not available as described above with reference to FIGS. 2-4.

The mode selection module 615 may select a PS operating mode based on the determination that CSFB service is not available as described above with reference to FIGS. 2-4. The mode selection module 615 may also select a CSFB operating mode based on determining that the signal quality for the 1x cell is above the threshold as described above with reference to FIG. 4.

The data exchange module 620 may exchange PS data with the serving cell based on selecting the PS operating mode as described above with reference to FIGS. 2-4. In some examples, exchanging PS data comprises receiving a paging message from the serving cell.

Figure 7:
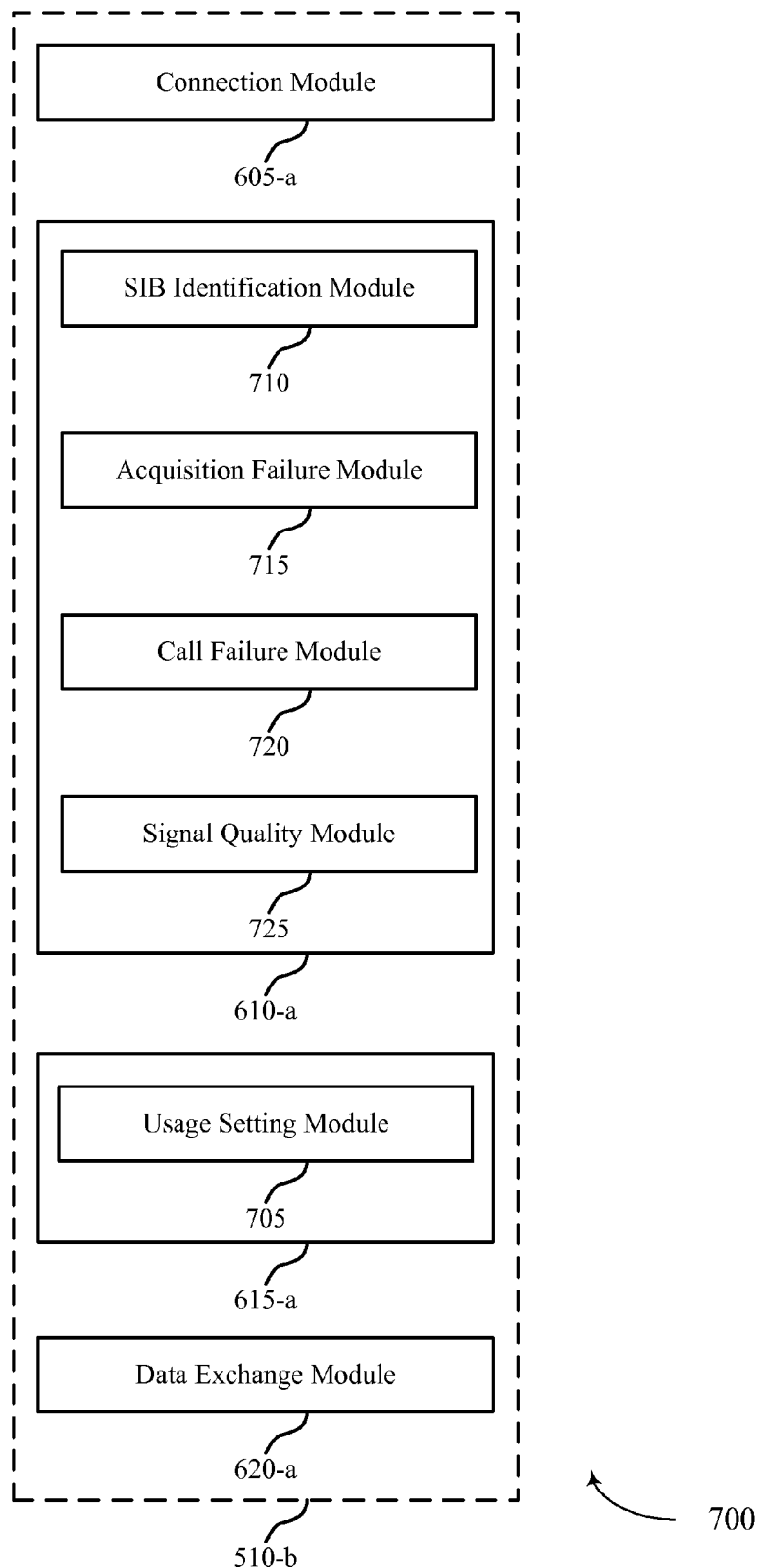
FIG. 7 shows a block diagram of a CSFB module configured for intelligent mode selection for CSFB devices in accordance with various aspects of the present disclosure.

FIG. 7 shows a block diagram 700 of a CSFB module 510-*b* for intelligent mode selection for CSFB devices in accordance with various aspects of the present disclosure. The CSFB module 510-*b* may be an example of aspects of a CSFB module 510 described with reference to FIGS. 5-6. The CSFB module 510-*b* may include a connection module 605-*a*, a CSFB service availability module 610-*a*, a mode selection module 615-*a*, and a data exchange module 620-*a*. Each of these modules may perform the functions described above with reference to FIG. 6. The CSFB module 510-*b* may also include an usage setting module 705, a SIB identification module 710, an acquisition failure module 715, a call failure module 720, and a signal quality module 725.

The components of the CSFB module 510-*b* may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The usage setting module 705 may identify a voice centric usage setting of the UE, and selecting the PS operating mode may be based on the identified voice centric usage setting as described above with reference to FIGS. 2-4. In some examples, selecting the PS operating mode includes selecting a data centric usage setting.

The SIB identification module 710 may determine that a CSFB SIB has not been received from a serving cell, and determining that the CSFB service is not available may be based on determining that the CSFB SIB has not been received as described above with reference to FIGS. 2-4. In some examples, the CSFB SIB may be SIB8.

The acquisition failure module 715 may determine that an attempt to acquire system information for a CSFB network has failed, and determining that the CSFB service is not available may be based on the failed attempt as described above with reference to FIGS. 2-4. The acquisition failure module 715 may also increment a failed attempt counter based on the failed attempt. The acquisition failure module 715 may also determine that the failed attempt counter exceeds a threshold, where determining that the CSFB service is not available may be based on determining that the failed attempt counter exceeds the threshold.

The call failure module 720 may determine that a voice call paging message has been received as described above with reference to FIGS. 2-4 (e.g., for a call terminating at the UE 115). The call failure module 720 may also determine that an expected voice call has not been received based, e.g., on the received voice call paging message, and determining that the CSFB service is not available may be based on determining that the expected voice call has not been received. In some cases, the call failure module 720 may determine that a call originating at the UE 115 has failed. The call failure module 720 may also increment a failed call counter based on determining that the expected voice call has not been received (or that a call originating at the UE 115 has failed), and determining that the CSFB service is not available may be based on the failed call counter.

The signal quality module 725 may determine that a signal quality for a 1x cell is below a threshold, and determining that the CSFB service is not available may be based at on determining that the signal quality for the 1x cell is below the threshold as described above with reference to FIGS. 2-4. The signal quality module 725 may also periodically evaluate the signal quality based on the PS operating mode. The signal quality module 725 may also determine that the signal quality for the 1x cell is above the threshold as described above.

Figure 8:
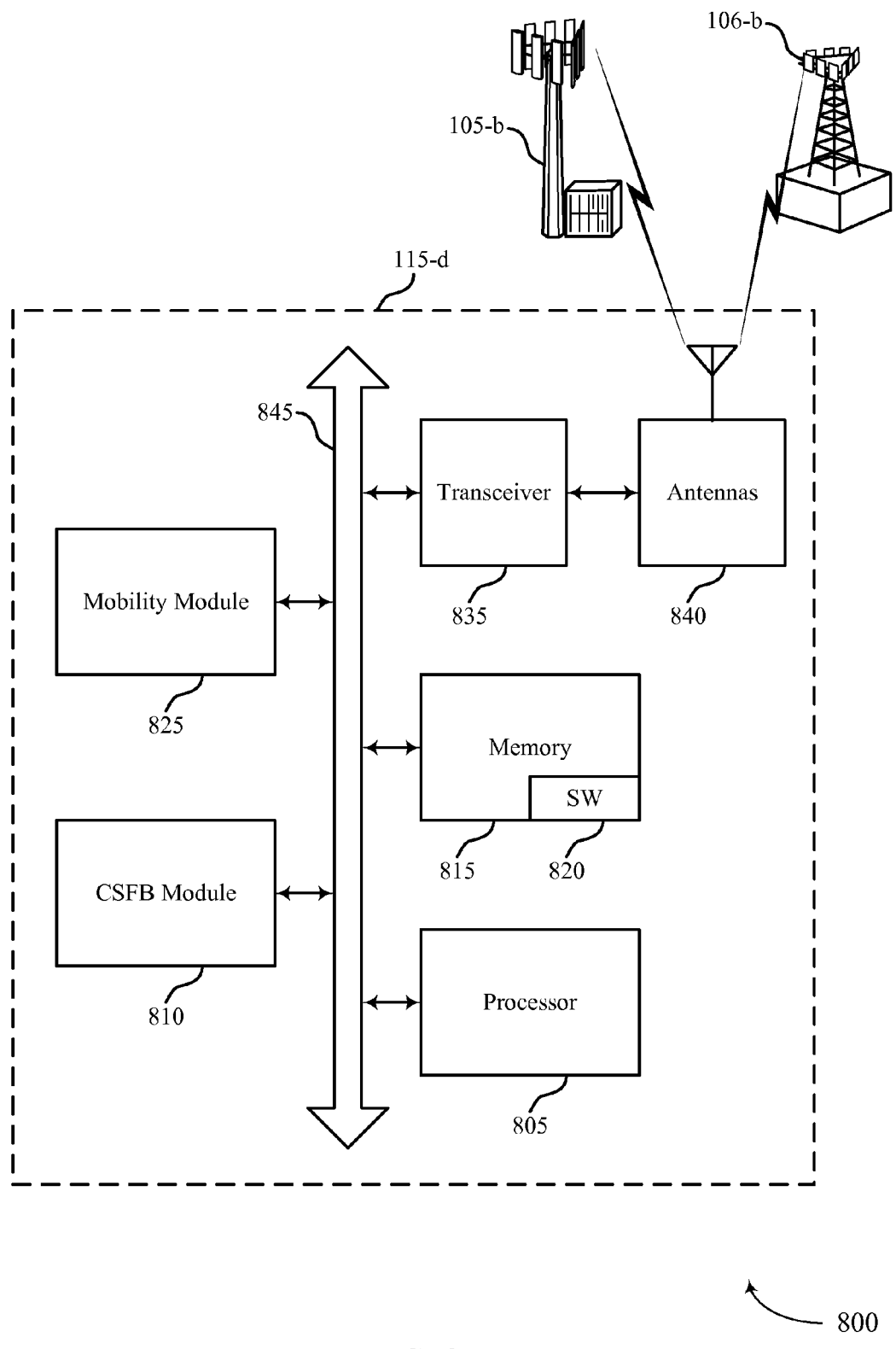
FIG. 8 illustrates a block diagram of a system including a UE configured for intelligent mode selection for CSFB devices in accordance with various aspects of the present disclosure.

FIG. 8 shows a diagram of a system 800 including a UE 115 configured for intelligent mode selection for CSFB devices in accordance with various aspects of the present disclosure. System 800 may include UE 115-d, which may be an example of a UE 115 described above with reference to FIGS. 1-7. UE 115-d may include a CSFB module 810, which may be an example of a CSFB module 510 described with reference to FIGS. 2-7. UE 115-d may also include a mobility module 825. UE 115-d may also include components for bi-directional voice and data communications including components for transmitting communications and components for receiving communications. For example, UE 115-d may communicate bi-directionally with base station 105-b or 1x cell 106-b.

The mobility module 825 may perform a mobility procedure as described above with reference to FIGS. 2-4. In some cases, UE 115-d may select a voice centric usage setting based on performing the mobility procedure.

UE 115-d may also include a processor module 805, and memory 815 (including software (SW) 820), a transceiver module 835, and one or more antennas 840, each of which may communicate, directly or indirectly, with each other (e.g., via buses 845). The transceiver module 835 may communicate bi-directionally, via the antenna(s) 840 or wired or wireless links, with one or more networks, as described above. For example, the transceiver module 835 may communicate bi-directionally with a base station 105 and/or another UE 115. The transceiver module 835 may include a modem to modulate the packets and provide the modulated packets to the antennas 840 for transmission, and to demodulate packets received from the antennas 840. While UE 115-d may include a single antenna 840, UE 115-d may also have multiple antennas 840 capable of concurrently transmitting or receiving multiple wireless transmissions.

The memory 815 may include random access memory (RAM) and read only memory (ROM). The memory 815 may store computer-readable, computer-executable software/firmware code 820 including instructions that, when executed, cause the processor module 805 to perform various functions described herein (e.g., intelligent mode selection for CSFB devices, etc.). Alternatively, the software/firmware code 820 may not be directly executable by the processor module 805 but cause a computer (e.g., when compiled and executed) to perform functions described herein. The processor module 805 may include an intelligent hardware device, (e.g., a central processing unit (CPU), a microcontroller, an ASIC, etc.)

Figure 9:
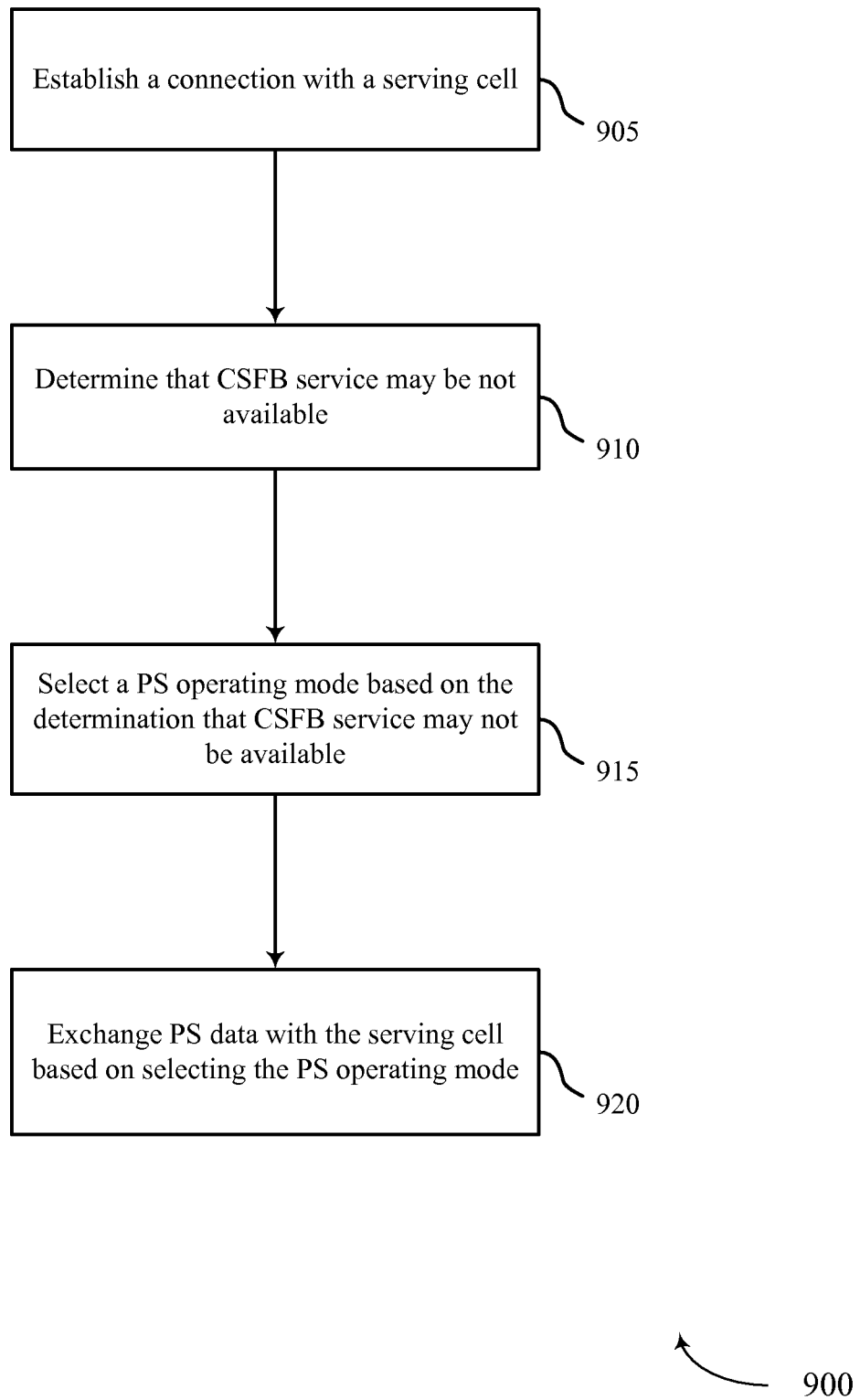
FIG. 9 shows a flowchart illustrating a method for intelligent mode selection for CSFB devices in accordance with various aspects of the present disclosure.

FIG. 9 shows a flowchart illustrating a method 900 for intelligent mode selection for CSFB devices in accordance with various aspects of the present disclosure. The operations of method 900 may be implemented by a UE 115 or its components as described with reference to FIGS. 1-8. For example, the operations of method 900 may be performed by the CSFB module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware.

At block 905, the UE 115 may establish a connection with a serving cell as described above with reference to FIGS. 2-4. In certain examples, the operations of block 905 may be performed by the connection module 605 as described above with reference to FIG. 6.

At block 910, the UE 115 may determine that CSFB service is not available as described above with reference to FIGS. 2-4. In certain examples, the operations of block 910 may be performed by the CSFB service availability module 610 as described above with reference to FIG. 6.

At block 915, the UE 115 may select a PS operating mode based on the determination as described above with reference to FIGS. 2-4. In certain examples, the operations of block 915 may be performed by the mode selection module 615 as described above with reference to FIG. 6.

At block 920, the UE 115 may exchange PS data with the serving cell based on selecting the PS operating mode as described above with reference to FIGS. 2-4. In certain examples, the operations of block 920 may be performed by the data exchange module 620 as described above with reference to FIG. 6.

Figure 10:
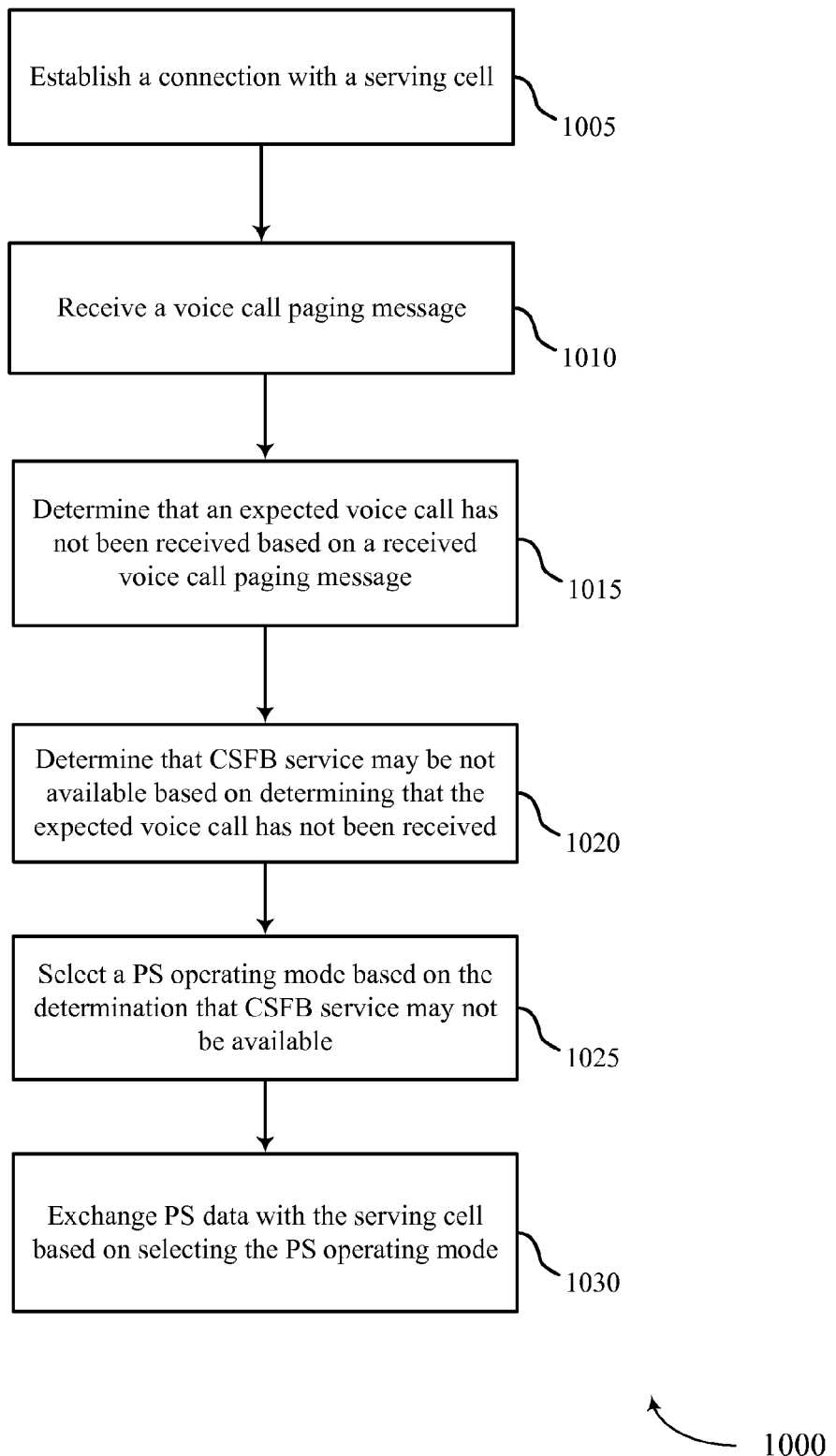
FIG. 10 shows a flowchart illustrating a method for intelligent mode selection for CSFB devices in accordance with various aspects of the present disclosure.

FIG. 10 shows a flowchart illustrating a method 1000 for intelligent mode selection for CSFB devices in accordance with various aspects of the present disclosure. The operations of method 1000 may be implemented by a UE 115 or its components as described with reference to FIGS. 1-8. For example, the operations of method 1000 may be performed by the CSFB module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware. The method 1000 may also incorporate aspects of method 900 of FIG. 9.

At block 1005, the UE 115 may establish a connection with a serving cell as described above with reference to FIGS. 2-4. In certain examples, the operations of block 1005 may be performed by the connection module 605 as described above with reference to FIG. 6.

At block 1010, the UE 115 may receive a voice call paging message as described above with reference to FIGS. 2-4. In certain examples, the operations of block 1010 may be performed by the call failure module 720 as described above with reference to FIG. 7.

At block 1015, the UE 115 may determine that an expected voice call has not been received based at least in part on the received voice call paging message as described above with reference to FIGS. 2-4. In certain examples, the operations of block 1015 may be performed by the call failure module 720 as described above with reference to FIG. 7.

At block 1020, the UE 115 may determine that CSFB service is not available based at least in part on determining that the expected voice call has not been received as described above with reference to FIGS. 2-4. In certain examples, the operations of block 1020 may be performed by the CSFB service availability module 610 as described above with reference to FIG. 6.

At block 1025, the UE 115 may select a PS operating mode based on the determination as described above with reference to FIGS. 2-4. In certain examples, the operations of block 1025 may be performed by the mode selection module 615 as described above with reference to FIG. 6.

At block 1030, the UE 115 may exchange PS data with the serving cell based on selecting the PS operating mode as described above with reference to FIGS. 2-4. In certain examples, the operations of block 1030 may be performed by the data exchange module 620 as described above with reference to FIG. 6.

Figure 11:
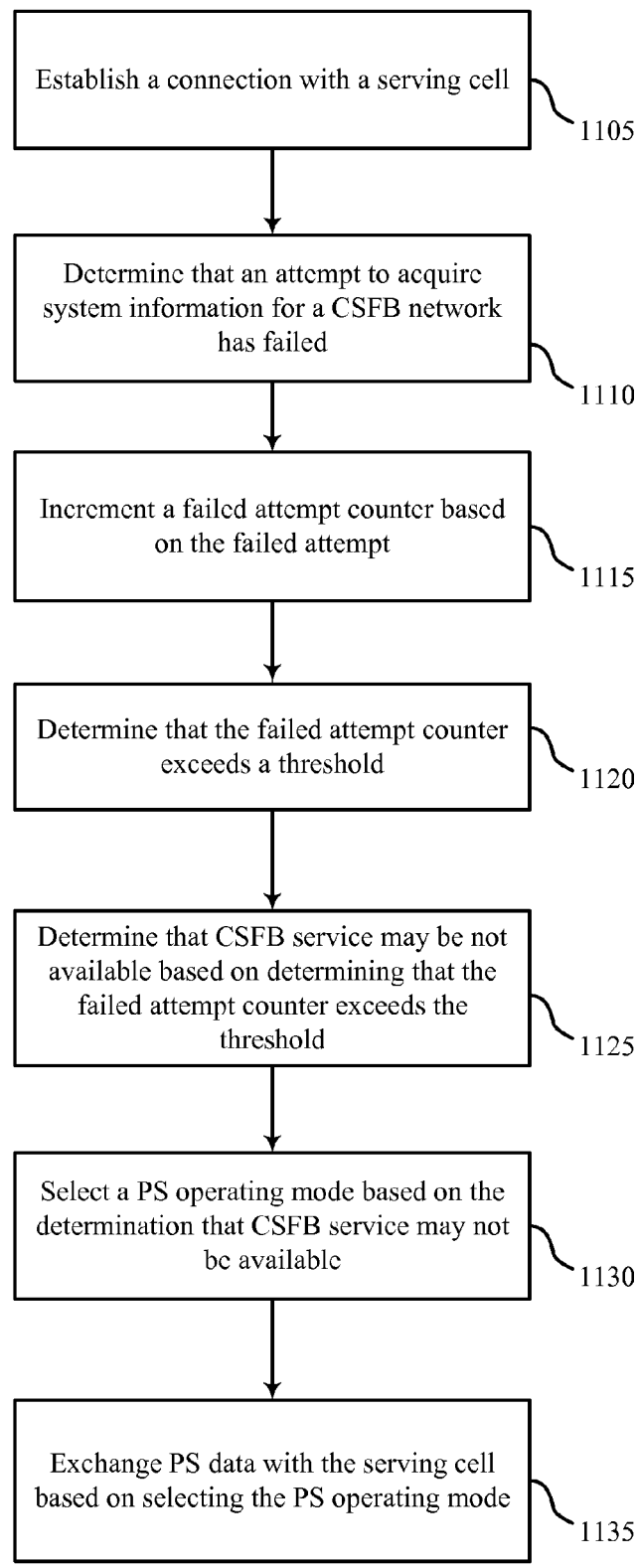
FIG. 11 shows a flowchart illustrating a method for intelligent mode selection for CSFB devices in accordance with various aspects of the present disclosure.

FIG. 11 shows a flowchart illustrating a method 1100 for intelligent mode selection for CSFB devices in accordance with various aspects of the present disclosure. The operations of method 1100 may be implemented by a UE 115 or its components as described with reference to FIGS. 1-8. For example, the operations of method 1100 may be performed by the CSFB module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware. The method 1100 may also incorporate aspects of methods 900, and 1000 of FIGS. 9-10.

At block 1105, the UE 115 may establish a connection with a serving cell as described above with reference to FIGS. 2-4. In certain examples, the operations of block 1105 may be performed by the connection module 605 as described above with reference to FIG. 6.

At block 1110, the UE 115 may determine that an attempt to acquire system information for a CSFB network has failed, wherein determining that the CSFB service is not available is based at least in part on the failed attempt as described above with reference to FIGS. 2-4. In certain examples, the operations of block 1110 may be performed by the acquisition failure module 715 as described above with reference to FIG. 7.

At block 1115, the UE 115 may increment a failed attempt counter based on the failed attempt as described above with reference to FIGS. 2-4. In certain examples, the operations of block 1115 may be performed by the acquisition failure module 715 as described above with reference to FIG. 7.

At block 1120, the UE 115 may determine that the failed attempt counter exceeds a threshold as described above with reference to FIGS. 2-4. In certain examples, the operations of block 1120 may be performed by the acquisition failure module 715 as described above with reference to FIG. 7.

At block 1125, the UE 115 may determine that CSFB service is not available based at least in part on determining that the failed attempt counter exceeds the threshold as described above with reference to FIGS. 2-4. In certain examples, the operations of block 1125 may be performed by the CSFB service availability module 610 as described above with reference to FIG. 6.

At block 1130, the UE 115 may select a PS operating mode based on the determination as described above with reference to FIGS. 2-4. In certain examples, the operations of block 1130 may be performed by the mode selection module 615 as described above with reference to FIG. 6.

At block 1135, the UE 115 may exchange PS data with the serving cell based on selecting the PS operating mode as described above with reference to FIGS. 2-4. In certain examples, the operations of block 1135 may be performed by the data exchange module 620 as described above with reference to FIG. 6.

Figure 12:
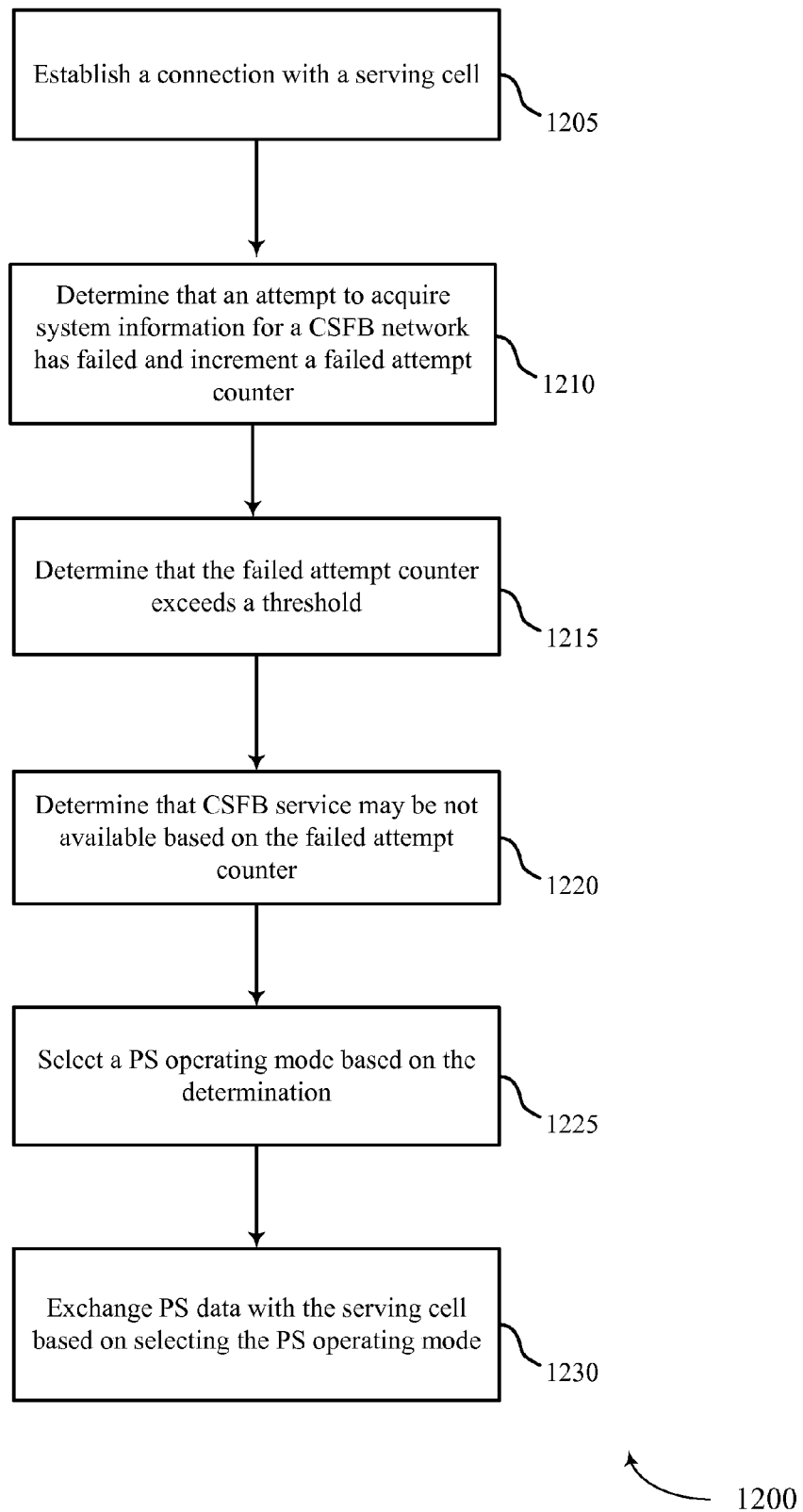
FIG. 12 shows a flowchart illustrating a method for intelligent mode selection for CSFB devices in accordance with various aspects of the present disclosure.

FIG. 12 shows a flowchart illustrating a method 1200 for intelligent mode selection for CSFB devices in accordance with various aspects of the present disclosure. The operations of method 1200 may be implemented by a UE 115 or its components as described with reference to FIGS. 1-8. For example, the operations of method 1200 may be performed by the CSFB module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware. The method 1200 may also incorporate aspects of methods 900, 1000, and 1100 of FIGS. 9-11.

At block 1205, the UE 115 may establish a connection with a serving cell as described above with reference to FIGS. 2-4. In certain examples, the operations of block 1205 may be performed by the connection module 605 as described above with reference to FIG. 6.

At block 1210, the UE 115 may determine that an attempt to acquire system information for a CSFB network has failed and increment a failed attempt counter as described above with reference to FIGS. 2-4. In certain examples, the operations of block 1210 may be performed by the acquisition failure module 715 as described above with reference to FIG. 7.

At block 1215, the UE 115 may determine that the failed attempt counter exceeds a threshold as described above with reference to FIGS. 2-4. In certain examples, the operations of block 1215 may be performed by the acquisition failure module 715 as described above with reference to FIG. 7.

At block 1220, the UE 115 may determine that CSFB service is not available based on the failed attempt counter as described above with reference to FIGS. 2-4. In certain examples, the operations of block 1220 may be performed by the CSFB service availability module 610 as described above with reference to FIG. 6.

At block 1225, the UE 115 may select a PS operating mode based on the determination as described above with reference to FIGS. 2-4. In certain examples, the operations of block 1225 may be performed by the mode selection module 615 as described above with reference to FIG. 6.

At block 1230, the UE 115 may exchange PS data with the serving cell based on selecting the PS operating mode as described above with reference to FIGS. 2-4. In certain examples, the operations of block 1230 may be performed by the data exchange module 620 as described above with reference to FIG. 6.

Figure 13:
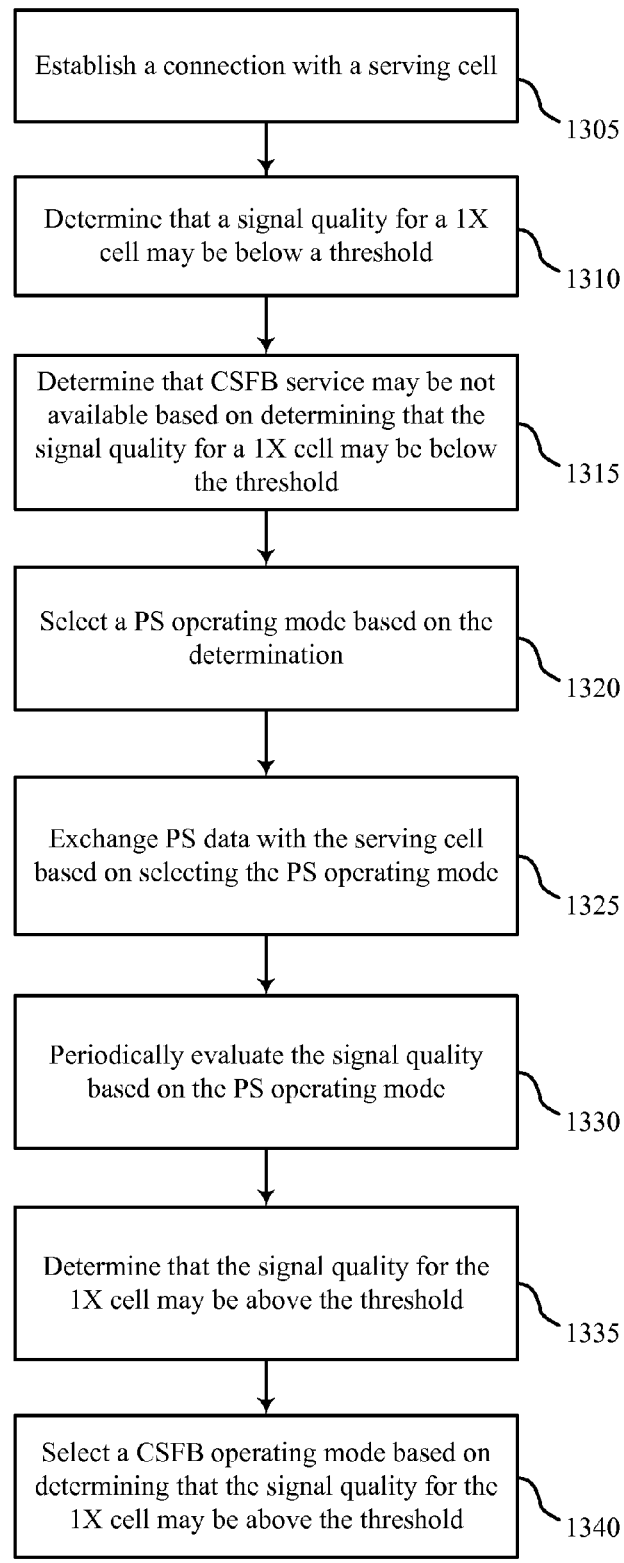
FIG. 13 shows a flowchart illustrating a method for intelligent mode selection for CSFB devices in accordance with various aspects of the present disclosure.

FIG. 13 shows a flowchart illustrating a method 1300 for intelligent mode selection for CSFB devices in accordance with various aspects of the present disclosure. The operations of method 1300 may be implemented by a UE 115 or its components as described with reference to FIGS. 1-8. For example, the operations of method 1300 may be performed by the CSFB module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware. The method 1300 may also incorporate aspects of methods 900, 1000, 1100, and 1200 of FIGS. 9-12.

At block 1305, the UE 115 may establish a connection with a serving cell as described above with reference to FIGS. 2-4. In certain examples, the operations of block 1305 may be performed by the connection module 605 as described above with reference to FIG. 6.

At block 1310, the UE 115 may determine that a signal quality for a 1x cell is below a threshold as described above with reference to FIGS. 2-4. In certain examples, the operations of block 1310 may be performed by the signal quality module 725 as described above with reference to FIG. 7.

At block 1315, the UE 115 may determine that CSFB service is not available based at least in part on determining that the signal quality for the 1x cell is below the threshold as described above with reference to FIGS. 2-4. In certain examples, the operations of block 1315 may be performed by the CSFB service availability module 610 as described above with reference to FIG. 6.

At block 1320, the UE 115 may select a PS operating mode based on the determination as described above with reference to FIGS. 2-4. In certain examples, the operations of block 1320 may be performed by the mode selection module 615 as described above with reference to FIG. 6.

At block 1325, the UE 115 may exchange PS data with the serving cell based on selecting the PS operating mode as described above with reference to FIGS. 2-4. In certain examples, the operations of block 1325 may be performed by the data exchange module 620 as described above with reference to FIG. 6.

At block 1330, the UE 115 may periodically evaluate the signal quality based on the PS operating mode as described above with reference to FIGS. 2-4. In certain examples, the operations of block 1330 may be performed by the signal quality module 725 as described above with reference to FIG. 7.

At block 1335, the UE 115 may determine that the signal quality for the 1x cell is above the threshold as described above with reference to FIGS. 2-4. In certain examples, the operations of block 1335 may be performed by the signal quality module 725 as described above with reference to FIG. 7.

At block 1340, the UE 115 may select a CSFB operating mode based on determining that the signal quality for the 1x cell is above the threshold as described above with reference to FIGS. 2-4. In certain examples, the operations of block 1340 may be performed by the mode selection module 615 as described above with reference to FIG. 6.

Thus, methods 900, 1000, 1100, 1200, and 1300 may provide for intelligent mode selection for CSFB devices. It should be noted that methods 900, 1000, 1100, 1200, and 1300 describe possible implementation, and that the operations and the steps may be rearranged or otherwise modified such that other implementations are possible. In some examples, aspects from two or more of the methods 900, 1000, 1100, 1200, and 1300 may be combined.

The detailed description set forth above in connection with the appended drawings describes examples embodiments and does not represent all the embodiments that may be implemented or that are within the scope of the claims. The term "exemplary," which may be used throughout this description means, "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable read only memory (EEPROM), compact disk (CD) ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

Techniques described herein may be used for various wireless communications systems such as CDMA, time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

UTRA and E-UTRA are part of Universal Mobile Telecommunications system (UMTS). 3GPP Long Term Evolution (LTE) and LTE-Advanced (LTE-A) are new releases of UMTS that use E-UTRA. UTRA, E-UTRA, UMTS, LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method of wireless communication at a user equipment (UE), comprising:
   establishing a connection with a serving cell;
   incrementing a counter for each attempt of a plurality of attempts to receive system information for using circuit switched fall back (CSFB) service or for each attempt of a plurality of attempts to receive a voice call using CSFB service;
   determining that CSFB service is unavailable based at least in part on the counter exceeding a threshold;
   selecting a packet switched (PS) operating mode based at least in part on the determination that CSFB service is unavailable; and
   exchanging PS data with the serving cell based at least in part on selecting the PS operating mode.

2. The method of claim 1, further comprising:
   identifying a voice centric usage setting of the UE, wherein selecting the PS operating mode is based at least in part on the identified voice centric usage setting.

3. The method of claim 2, wherein selecting the PS operating mode comprises:
   selecting a data centric usage setting.

4. The method of claim 1, further comprising:
   determining that a CSFB system information block (SIB) has not been received from the serving cell, wherein determining that the CSFB service is unavailable is based at least in part on determining that the CSFB SIB has not been received.

5. The method of claim 4, wherein the CSFB SIB is SIB8.

6. The method of claim 1, wherein each attempt of the plurality of attempts to receive system information comprises:
   attempting to acquire system information for a CSFB network.

7. The method of claim 1, wherein each attempt of the plurality of attempts to receive the voice call using CSFB service comprises:
   receiving a voice call paging message; and
   determining that an expected voice call has not been received based at least in part on the received voice call paging message, wherein determining that the CSFB service is unavailable is based at least in part on determining that the expected voice call has not been received.

8. The method of claim 1, wherein each attempt of the plurality of attempts to receive system information for CSFB service comprises:
   determining that a signal quality for a 1x cell is below a threshold, wherein determining that the CSFB service is unavailable is based at least in part on determining that the signal quality for the 1x cell is below the threshold.

9. The method of claim 8, further comprising:
   periodically evaluating the signal quality based on the PS operating mode;
   determining that the signal quality for the 1x cell is above the threshold; and
   selecting a CSFB operating mode based on determining that the signal quality for the 1x cell is above the threshold.

10. The method of claim 1, wherein exchanging PS data comprises:
    receiving a paging message from the serving cell.

11. The method of claim 1, further comprising:
    performing a mobility procedure; and
    selecting a voice centric usage setting based on performing the mobility procedure.

12. The method of claim 1, further comprising:
    determining that the serving cell comprises a small cell, and wherein incrementing the counter for each attempt of the plurality of attempts to receive system information is based at least in part on the serving cell being the small cell.

13. An apparatus for wireless communication at a user equipment (UE), comprising:
    a processor;
    memory in electronic communication with the processor; and
    instructions stored in the memory; wherein the instructions are executable by the processor to cause the apparatus to:
      establish a connection with a serving cell;
      increment a counter for each attempt of a plurality of attempts to receive system information for using circuit switched fall back (CSFB) service or for each attempt of a plurality of attempts to receive a voice call using CSFB service;

determine that CSFB service is unavailable based at least in part on the counter exceeding the threshold;
select a packet switched (PS) operating mode based at least in part on the determination that CSFB service is unavailable; and
exchange PS data with the serving cell based at least in part on selecting the PS operating mode.

14. The apparatus of claim 13, wherein the instructions are executable by the processor to cause the apparatus to:
identify a voice centric usage setting of the UE, wherein selecting the PS operating mode is based at least in part on the identified voice centric usage setting.

15. The apparatus of claim 14, wherein the instructions are executable by the processor to cause the apparatus to:
select a data centric usage setting.

16. The apparatus of claim 13, wherein the instructions are executable by the processor to cause the apparatus to:
determine that a CSFB system information block (SIB) has not been received from the serving cell, wherein determining that the CSFB service is unavailable is based at least in part on determining that the CSFB SIB has not been received.

17. The apparatus of claim 16, wherein the CSFB SIB is SIB8.

18. The apparatus of claim 13, wherein the instructions are executable by the processor to cause the apparatus to:
attempt to acquire system information for a CSFB network; and
increment the counter for each attempt of the plurality of attempts to receive system information based at least in part on the attempt to acquire system information for the CSFB network.

19. The apparatus of claim 13, wherein the instructions are executable by the processor to cause the apparatus to:
receive a voice call paging message;
determine that an expected voice call has not been received based at least in part on the received voice call paging message; and
increment the counter for each attempt of the plurality of attempts to receive a voice call based at least in part on determining that the expected voice call has not been received.

20. The apparatus of claim 13, wherein the instructions are executable by the processor to cause the apparatus to:
determine that a signal quality for a 1x cell is below a threshold; and
increment the counter for each attempt of the plurality of attempts to receive system information based at least in part on determining that the signal quality for the 1x cell is below the threshold.

21. The apparatus of claim 20, wherein the instructions are executable by the processor to cause the apparatus to:
periodically evaluate the signal quality based on the PS operating mode;
determine that the signal quality for the 1x cell is above the threshold; and
select a CSFB operating mode based on determining that the signal quality for the 1x cell is above the threshold.

22. The apparatus of claim 13, wherein the instructions are executable by the processor to cause the apparatus to:
receive a paging message from the serving cell based on selecting the PS operating mode.

23. The apparatus of claim 13, wherein the instructions are executable by the processor to cause the apparatus to:
perform a mobility procedure; and
select a voice centric usage setting based on performing the mobility procedure.

24. The apparatus of claim 13, wherein the instructions are executable by the processor to cause the apparatus to:
determine that the serving cell comprises a small cell; and
increment the counter for each attempt of the plurality of attempts to receive system information based at least in part on the serving cell being the small cell.

25. An apparatus for wireless communication at a user equipment (UE), comprising:
means for establishing a connection with a serving cell;
means for incrementing a counter for each attempt of a plurality of attempts to receive system information for using circuit switched fall back (CSFB) service or for each attempt of a plurality of attempts to receive a voice call using CSFB service;
means for determining that CSFB service is unavailable based at least in part on the counter exceeding a threshold;
means for selecting a packet switched (PS) operating mode based at least in part on the determination that CSFB service is unavailable; and
means for exchanging PS data with the serving cell based at least in part on selecting the PS operating mode.

26. A non-transitory computer-readable medium storing code for wireless communication at a user equipment (UE), the code comprising instructions executable to:
establish a connection with a serving cell;
increment a counter for each attempt of a plurality of attempts to receive system information or a voice call from a cell that supports circuit switched fall back (CSFB) service;
determine that (CSFB) CSFB service is unavailable based at least in part on the counter exceeding a threshold;
select a packet switched (PS) operating mode based at least in part on the determination that CSFB service is unavailable; and
exchange PS data with the serving cell based at least in part on selecting the PS operating mode.

* * * * *